United States Patent
Heinke et al.

(10) Patent No.: US 7,164,467 B2
(45) Date of Patent: Jan. 16, 2007

(54) METHOD AND APPARATUS FOR ELECTRONICALLY GENERATING AN OUTLINE INDICATING THE SIZE OF AN ENERGY ZONE IMAGED ONTO THE IR DETECTOR OF A RADIOMETER

(75) Inventors: Thomas Heinke, Santa Cruz, CA (US); Paul Carlson, Santa Cruz, CA (US); Ken Pomper, Santa Cruz, CA (US)

(73) Assignee: Fluke Corporation, Everett, WA (US)

( * ) Notice: Subject to any disclaimer, the term of this patent is extended or adjusted under 35 U.S.C. 154(b) by 190 days.

(21) Appl. No.: 10/776,385

(22) Filed: Feb. 10, 2004

(65) Prior Publication Data

US 2005/0174558 A1    Aug. 11, 2005

(51) Int. Cl.
*G01C 3/08* (2006.01)
(52) U.S. Cl. ...................................... 356/4.03
(58) Field of Classification Search ................ 356/4.03
See application file for complete search history.

(56) References Cited

U.S. PATENT DOCUMENTS

| | | | |
|---|---|---|---|
| 3,856,399 A | * | 12/1974 | Hosoe et al. ............... 356/3.05 |
| 4,343,182 A | | 8/1982 | Pompei |
| 4,494,881 A | * | 1/1985 | Everest ........................ 374/124 |
| 4,739,560 A | * | 4/1988 | Akutsu et al. ................. 33/361 |
| 5,133,605 A | * | 7/1992 | Nakamura ................... 374/124 |
| 5,742,379 A | * | 4/1998 | Reifer ......................... 356/5.07 |
| 6,234,669 B1 | | 5/2001 | Kienitz |

FOREIGN PATENT DOCUMENTS

JP        02245624 A   * 10/1990

* cited by examiner

*Primary Examiner*—Thomas H. Tarcza
*Assistant Examiner*—Luke D. Ratcliffe
(74) *Attorney, Agent, or Firm*—Charles E. Krueger

(57) ABSTRACT

A radiometer includes a sighting system that generates a digital image of an object surface having an area that is to be imaged onto the IR detector. A shape outline is overlaid on the digital image of an object surface to indicate the extent of the energy zone that is imaged onto the IR detector. A rangefinder measures the distance between the radiometer and the object surface and the measured distance is utilized to determine the size of the overlaid shape.

9 Claims, 7 Drawing Sheets

METHOD AND APPARATUS FOR ELECTRONICALLY GENERATING AN OUTLINE INDICATING THE SIZE OF AN ENERGY ZONE IMAGED ONTO THE IR DETECTOR OF A RADIOMETER

BACKGROUND OF THE INVENTION

The invention relates to a device for remote or non-contact temperature measurement. Such a device which is known in the art as a radiometer, performs non-contact temperature measurement and comprises a detector for receiving heat radiation emanating from an energy zone on an object surface of an object of measurement, an infrared (IR) optical system for imaging the heat radiation emanating from the energy zone onto the detectors and a sighting arrangement for identifying the position and size of the energy zone on the object of measurement by means of visible light. A further processing arrangement which converts the detector signal into a temperature indication is also connected to the detector.

In this case the IR optical system is so designed that at a certain measurement distance for the most part only heat radiation from a certain area of the object of measurement, namely the energy zone, is focused onto the detector. In most cases the size of the energy zone is defined by the area from which 90% of the heat rays focused onto the detector are emitted. However, applications are also known in which there are reference to values between 50% and 100%.

The pattern of the dependence of the size of the energy zone upon the measurement distance depends upon the design of the IR optical system. A fundamental distinction is made between distant focusing and close focusing. In distant focusing the IR optical system images the detector into infinity and in close focusing it images it onto the focus plane at a finite distance. In the case of distant focusing it is necessary to deal with an energy zone size which grows linearly with the measurement distance, whereas in close focusing the energy zone size can decrease between the radiometer and the focus plane.

In non-contact temperature measurement it is indispensable in practical use that the energy zone on the object to be examined should be rendered visible in a suitable way. In the past, various attempts were made to render the position and size of the energy zone, which is invisible per se, visible by illumination. According to JP-A-47-22521 a plurality of rays which originate from several light sources or are obtained by reflection from a light source are directed along the marginal rays of a close-focused optical system onto the object of measurement. In this way the size and position of the energy zone for a close-focused system can be rendered visible by an annular arrangement of illuminated points around the energy zone.

U.S. Pat. No. 5,368,392 describes various methods of outlining energy zones by laser beams. These include the mechanical deflection of one or several laser beams as well as the splitting of a laser beam by a beam divider or a fiber optic system into several single beams which surround the energy zone. However, these sighting arrangements can only used in an optical system which images into infinity. In an optical system which images into the finite an image of the detector is reduced and then enlarged by the optical system along an optical axis onto an energy zone on the object from the optical system to the so-called sharp point energy zone.

In U.S. Pat. No. 6,234,669, which is assigned to the assignee of the present application, a device for non-contact temperature measurement of an object is described with an IR optical system in which an image of the detector along an optical axis is imaged onto an energy zone on the object in such a way that the image of the detector decreases in size between the optical system and a sharp point focus zone and then enlarges. A sighting arrangement is also described which identifies the outer limit of the energy zone by means of visible sighting rays. Each sighting ray is aligned obliquely with respect to the optical axis in such a way that each sighting ray can be used both before and also after the sharp point energy zone to identify the energy zone.

Accordingly, improved systems for indicating the extent of the energy zone to a user are the subject of active investigation in the industry.

BRIEF SUMMARY OF THE INVENTION

In one embodiment of the invention, a digital imaging system is utilized to provide an image of the object surface having an area whose temperature is to be measured by a radiometer. A circle is overlaid on the displayed image of the object surface to indicate the extent of the energy zone.

In another embodiment of the invention, a rangefinder measures the distance between the radiometer and the object surface. An image controller utilizes the distance measurement to overlay a circle having the correct diameter to indicate the extent of the energy zone.

In another embodiment of the invention, data for generating circles of different diameters is stored in non-volatile memory. The distance measurement data is utilized to select correct circle data for generating a circle having the correct diameter to indicate the extent of the energy zone.

In another embodiment of the invention, distance is measured using triangulation.

In another embodiment of the invention, the triangulation system utilizes a laser and an offset position-sensitive diode.

Other features and advantages of the invention will be apparent in view of the following detailed description and appended drawings.

DETAILED DESCRIPTION OF THE INVENTION

Reference will now be made in detail to various embodiments of the invention. Examples of these embodiments are illustrated in the accompanying drawings. While the invention will be described in conjunction with these embodiments, it will be understood that it is not intended to limit the invention to any embodiment. On the contrary, it is intended to cover alternatives, modifications, and equivalents as may be included within the spirit and scope of the invention as defined by the appended claims. In the following description, numerous specific details are set forth in order to provide a thorough understanding of the various embodiments. However, the present invention may be practiced without some or all of these specific details. In other instances, well known process operations have not been described in detail in order not to unnecessarily obscure the present invention.

Various embodiments of the invention implement a sighting system for radiometers with a close focus point. For these types of radiometers, the IR beam profile starts with a large beam diameter at the instrument, which gets smaller and smaller as the distance diminishes to the focus point, where it reaches a minimum, then it grows again. For non-contact temperature measurement, knowledge of the beam diameter size at a given distance is important since it is the size of the beam diameter at the intersection of the beam and the object surface that defines the energy zone.

A first embodiment will now be described that uses a video camera and an electronic display which shows an image of the object being measured. A circle is electronically generated and overlaid over the image of the object being measured to indicate the true energy zone position and diameter on the display. The size and diameter of the circle are calculated inside the instrument from the known beam profile and the distance between the measured object surface and the radiometer. In this embodiment, in addition to showing the correct spot size, the offset between the video camera and the infrared channel is also compensated. The same electronic display can show the measured temperature and set parameters of the instrument.

Figure 1:
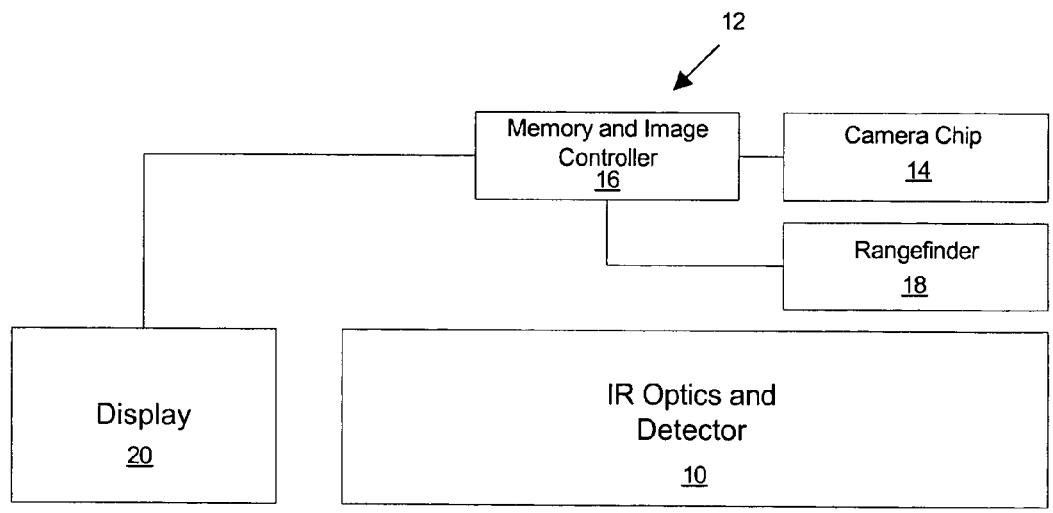
FIG. 1 is a high-level block diagram depicting an embodiment of the invention.

FIG. 1 is a high level block diagram of this embodiment. In this embodiment a standard radiometer 10 including IR optics and a detector can be designed as disclosed in commonly-assigned U.S. Pat. No. 5,836,694 which is hereby incorporated by reference for all purposes. A video sighting system 12 includes a Camera Chip 14, a Memory and Image Controller block 16, a Rangefinder 18, and a Display 20.

Figure 2:
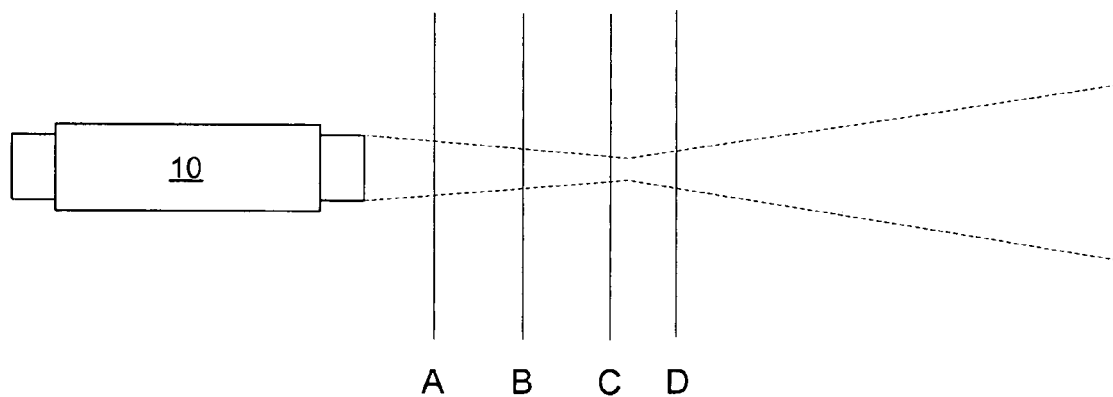
FIG. 2 is a view depicting the focusing characteristics for a near focus system.

As described above, the energy zone is the area on an object that is imaged onto the IR detector. FIG. 2 depicts a cross-section of the beam profile for a near-focus radiometer. The vertical lines A, B, C, and D represent objects at four different image planes.

Figure 3:
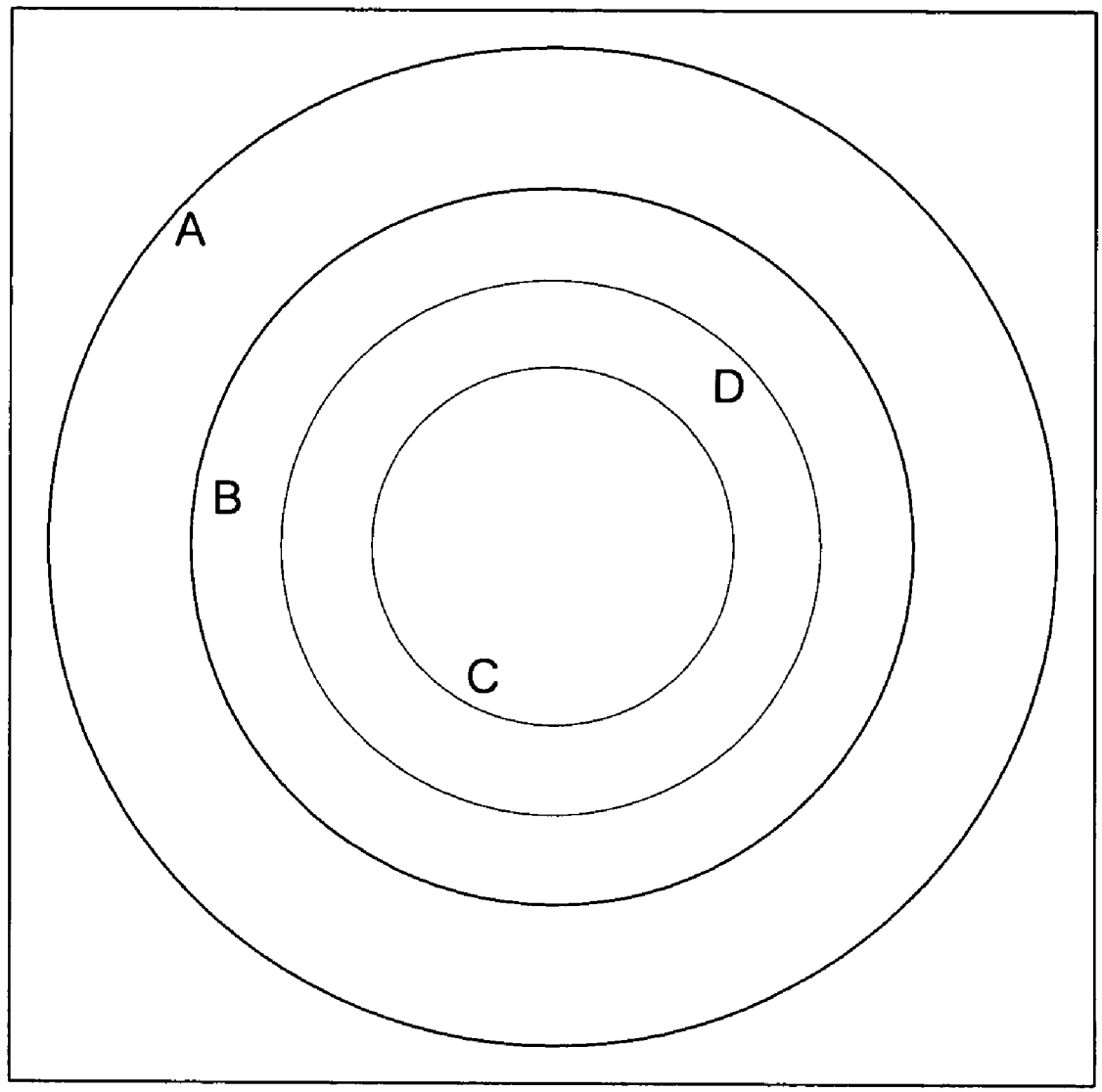
FIG. 3 is a diagram depicting the size of the energy zone at different distances.

FIG. 3 depicts the display device with circles superimposed over the image of an object surface generated by the imaging system. The circles A, B, C and D correspond to the size of the energy zone on the object when the object is positioned at image plane A, B, C, or D in FIG. 2. Accordingly, the size of the circle is determined by the distance of the object from the radiometer. In this example, the size of the circles decreases with increasing distance from the radiometer because all the image planes are located between the radiometer and the sharp focus spot.

Figure 4:
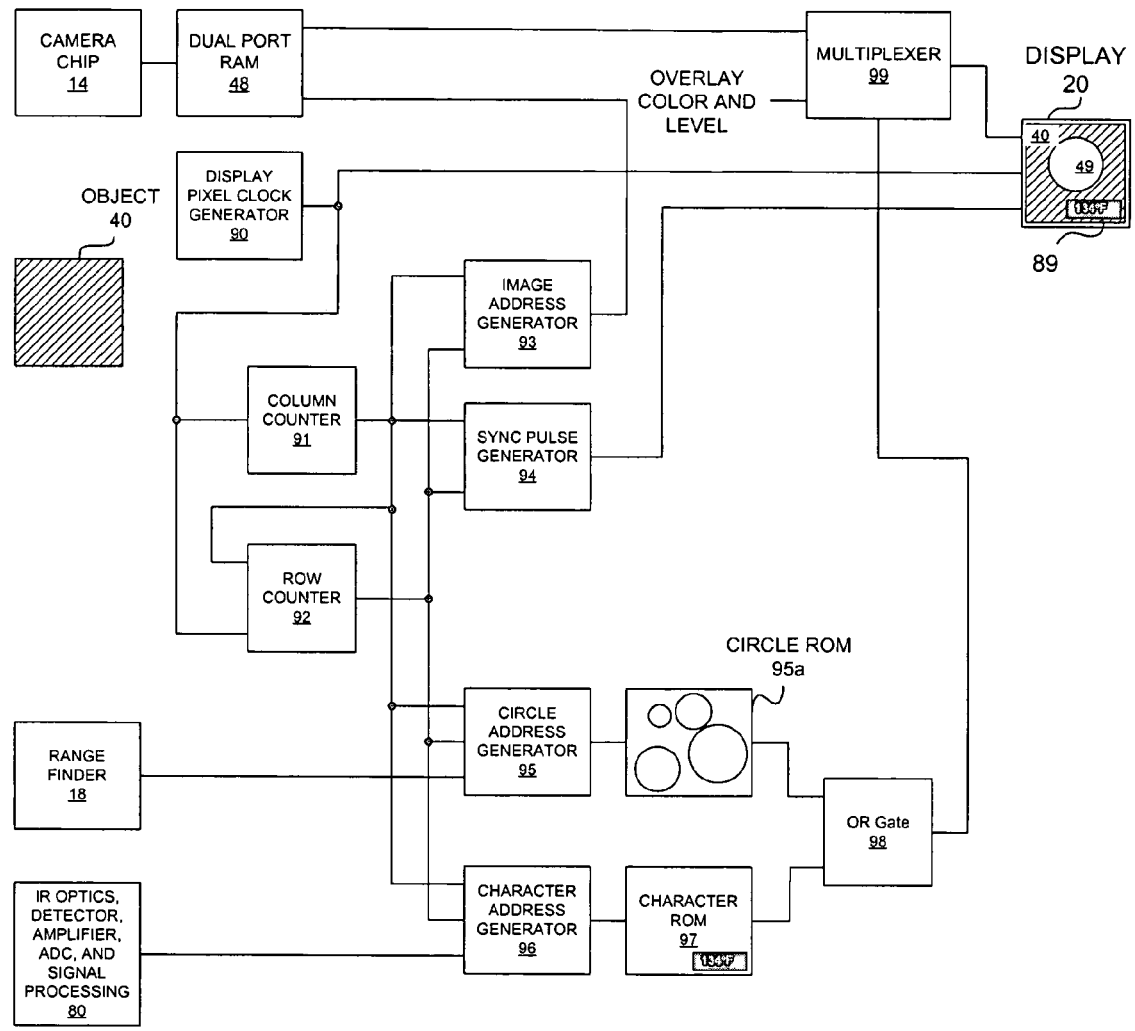
FIG. 4 is a block diagram of an embodiment of the invention.

The operation of an embodiment of the invention will now be described with reference to FIG. 4. In FIG. 4 the object surface to be imaged is a rectangular surface 40. As described above, the rays emitting from a circular energy zone of the object will be imaged onto the IR detector and the temperature of the part of the object surface included in the energy zone will be calculated by the radiometer.

The sighting system includes the Camera Chip 14, and the Rangefinder 18, and a Dual Port RAM 48. The image of the surface 40 is stored in the Dual Port RAM 48. The display system includes a Display Pixel Clock Generator 90, a Column Counter 91, a Row Counter 92, an Image Address Generator 93, a Sync Pulse Generator 94, a Circle Address Generator 95, a Circle ROM 95a, a Character Address Generator 96, a Character ROM 97, an OR Gate 98, a Multiplexer 99, and the Display 20.

The Pixel Clock generator 90 generates the pixel clock for the Display 20, the Column Counter 91, and the Row Counter 92. The Row Counter 92 changes state only at the end of a display line. The outputs of the Column Counter 91 and the Row Counter 92 are combined in the Image Address Generator 93 to generate the display image address. The display image address determines the output of the Dual Port RAM 48. The output of the Dual Port RAM 48 is usually passed to the Display 20 via the Multiplexer 99.

The outputs of the Column Counter 91 and the Row Counter 92 are also combined in the Sync Pulse Generator 94 to generate horizontal and vertical sync pulses for the display. This circuitry allows for different pixel clocks as well as different numbers of columns and rows for the Camera Chip 14 and the Display 20.

An inactive select-input of the Multiplexer 99 causes the images data from the Dual Port RAM to be passed through to the display, so that the object surface 40 is displayed on the Display 20. An active select-input of the Multiplexer 99 puts a fixed input signal with regard of color and brightness (level) to the input of the Display 20, so that the display shows a pixel or pixels with this color and brightness instead of the object surface 40.

Thus, by controlling the select-input of the Multiplexer 99 synchronously with the pixel clock and the state of the Column Counter 91 and the Row Counter 92 any geometric figure 49 or text 89 can be shown on the Display 20 as an overlay.

The Circle ROM 95a stores circle data for generating images of different size circles with an output of the Circle ROM 95a coupled via the OR gate 98 the select-input of the Multiplexer 99. The outputs of the Column Counter 91, the Row Counter 92, and the Range Finder 18 are combined in the Circle Address Generator to provide the address data for the Circle ROM 95a.

The stored circles in the Circle ROM 95a have sizes that, when overlaid on the object image, indicate the extent of the displayed object surface included within the energy zone for a particular object distance. The selection of which of the circles, stored in the Circle ROM 95a, to overlay is defined by the output of the Range Finder 18.

The Circle ROM 95a is programmable and for a particular device responds to distance data from the Rangefinder 18 to select the correct circle data that indicates the correct size of the energy zone when overlaid on the image of the object surface provided by the Camera Chip 14. The Circle ROM 95a is also programmed to position the selected circle within the display to compensate for parallax due to misalignment between the optical axes of the IR optical system and the video camera system.

The Character ROM 97 stores data for generating text to indicate the object surface temperature. The IR Optics, Detector, and analog and digital signal processing chain 80 measures the IR signal, transmitted from the object surface, calculates the object surface temperature and provides a digital signal, which represents the object surface temperature. This signal is combined with the outputs of the Column Counter 91 and the Row Counter 92 inside the Character Address Generator to provide the address data for the Character ROM 97. The output of the Character ROM 97 controls via the OR gate 98 the select-input of the Multiplexer 99 to overlay the object surface temperature 89 information on the Display 20.

Because of the inclusive coupling of the outputs of the Circle ROM 95a and the Character ROM 97 both can be overlaid: a circle to show the zone of energy collection and text to indicate the object surface temperature.

The Display 20 in this embodiment is an LCD display. As depicted in FIG. 4, the Display Chip overlays a circle onto the image of the object surface to indicate the portion of the object surface included in the energy zone 49 as well as the temperature information 89.

Figure 7:
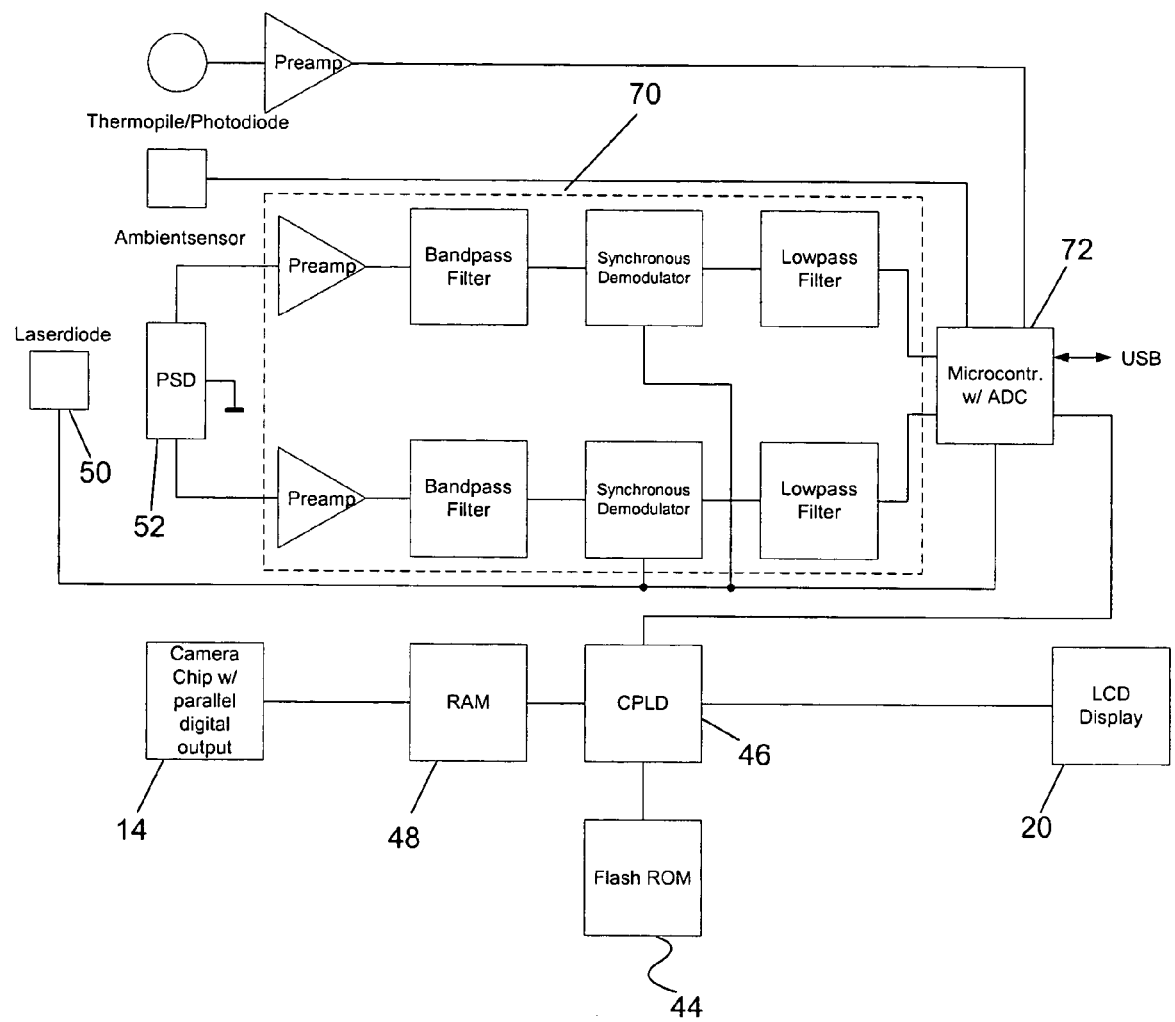
FIG. 7 is detailed block diagram of an embodiment of the invention.

In this embodiment, the components Column Counter 91, Row Counter 92, Image Address Generator 93, Sync Pulse Generator 94, Circle Address Generator 95, Character Address Generator 96, Or Gate 98, and Multiplexer 99 are combined in a single complex programmable logic chip (CPLD) 46, as shown in FIG. 7, described below. Also the Circle ROM 95a and the Character ROM 97 are combined in a single Flash ROM chip. The digital signal processing components of the Range Finder 18 as well as the IR signal processing chain 80 are combined in a single microcontroller chip 72, as shown in FIG. 7 as well.

Figure 4A:
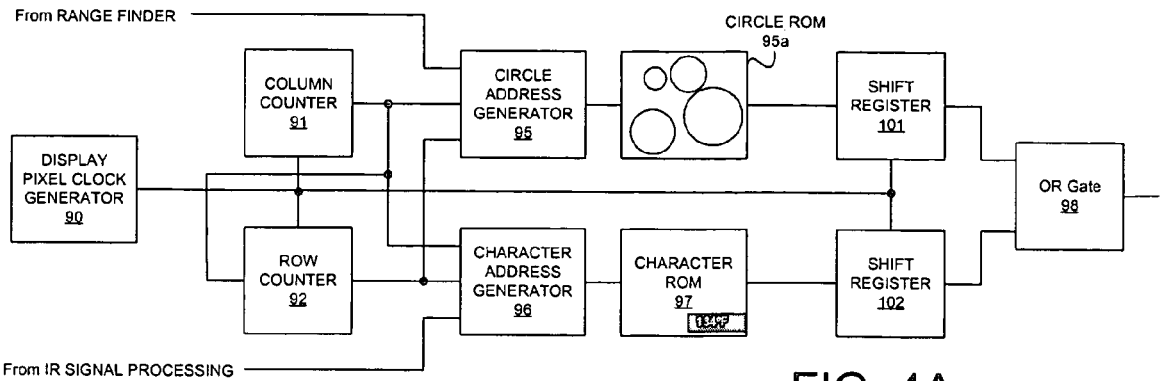
FIG. 4A is a block diagram of a first alternate embodiment of the invention.

A first alternative embodiment is depicted in FIG. 4A. In this embodiment the Display 20 is an Organic LED (OLED) display. Further, in the embodiment depicted in FIG. 4 ROM chips with a data width of only 1 bit are required. The more practical approach is the use of standard 8 bit wide ROMs and to convert the 8 bit parallel output into a 1 bit serial output via the Shift Registers 101 and 102 as depicted in FIG. 4A.

Figure 4B:
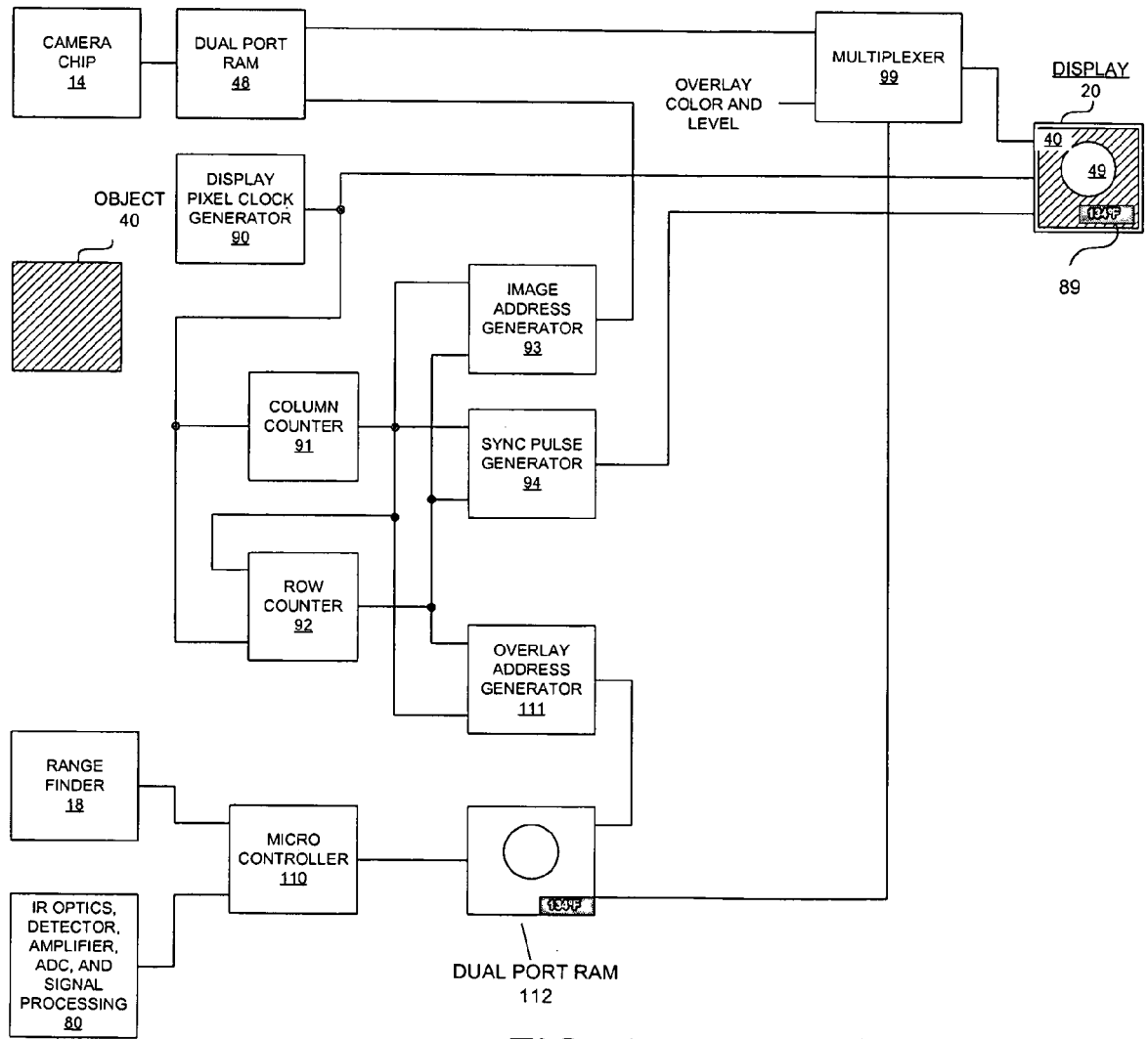
FIG. 4B is a block diagram of a second alternate embodiment of the invention.

A second alternative embodiment is depicted in FIG. 4B. The embodiment depicted in FIG. 4 would require fairly large ROM chips to implement the Circle ROM 95a as well as the Character ROM 97. A more practical approach is the use of a second Dual Port RAM 112 as a general overlay memory as depicted in FIG. 4B. In this case the outputs of the Column Counter 91 and the Row Counter 92 form the overlay address inside the Overlay Address Generator 111 and the overlay address is used to read data from the Overlay Dual Port RAM 112, which controls the Multiplexer 99. The overlay data is written by the Microcontroller 110 which calculates, in real time, both the overlay circle and the temperature indication text from the outputs of the Range Finder 18 and the IR Signal Processing 80. The Microcontroller 110 can physically be the same chip as the Microcontroller 72 in FIG. 7 described below.

Additionally, the Multiplexer 99 can have more than a single input for a fixed color and brightness. Instead it can have, for example, 3 inputs to implement 3 different overlay colors: one for the circle and temperature display within the normal range, one for the temperature display under range, and one for temperature display over range. In the case the data width of the Character ROM 97 (FIG. 4) or the Dual Port RAM 112 (FIG. 4B) needs to be increased.

Figure 5:
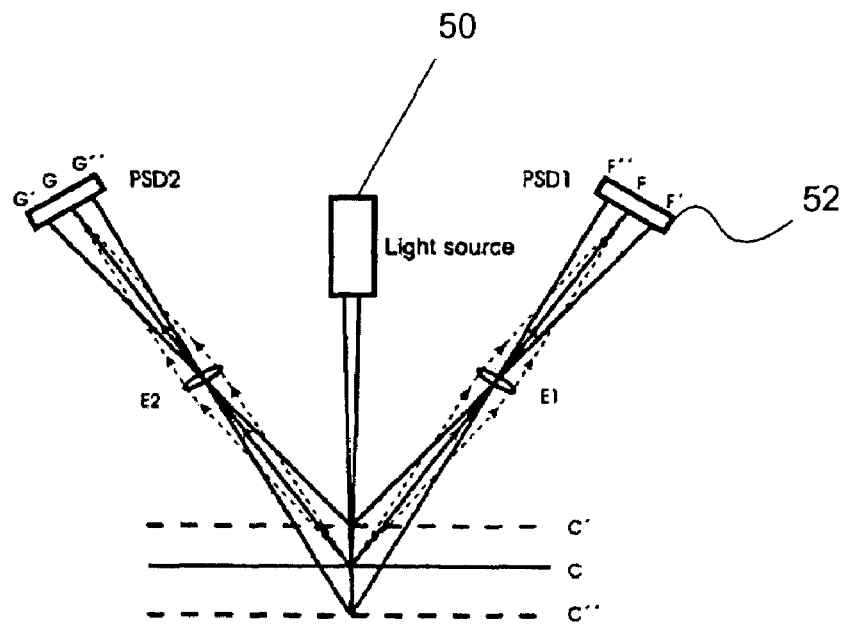
FIG. 5 is a diagram depicting an embodiment of a triangulation system.
Figure 6:
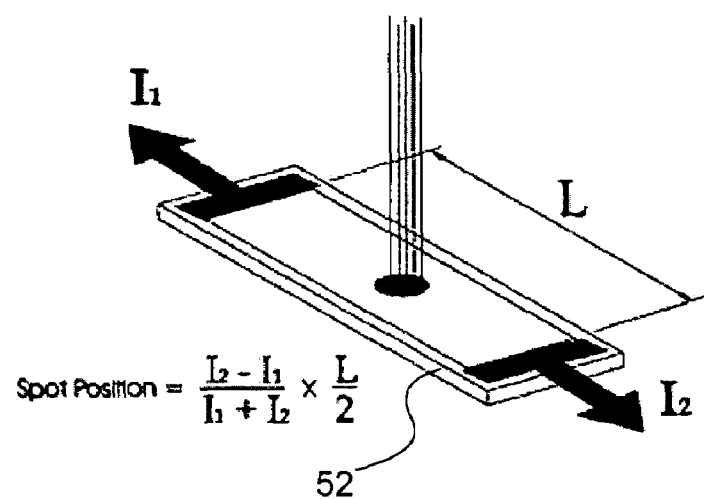
FIG. 6 is a perspective view of a position-sensitive diode.

In the presently described embodiment, the distance measurement is done by triangulation as depicted in FIGS. 5 and 6. In FIG. 5, a light source 50 sends a light beam that is reflected off the measured object surface. The reflected beam will hit an off-axis position sensitive photodiode (PSD) 52. As depicted in FIG. 6, the spot position of a reflected laser beam on the PSD 52 can be calculated by measuring $I_1$ and $I_2$.

For short distance systems, a complete off-the-shelf distance sensor, e.g., like GP2D12 manufactured by SHARP Corporation, can be used. FIG. 7 depicts a system for measuring long distances that utilizes a laser diode 50 as modulated light source and a lock-in-style electronics block 70 (narrow band filters, phase sensitive rectifiers, and low pass filters) to produce sufficient signal to noise ratio. The laser can be visible and coaxial with the infrared beam to indicate exactly the middle of the measured spot. This system can also be used for infinity focused instruments.

A MicroController 72 receives the $I_1$ and $I_2$ signal measurements which are digitized and utilized to calculate the distance to the object surface based on the magnitude of those signals. A calculated distance value is then transferred to the Display Controller 46.

As is known by persons of skill in the art, other types of distance measuring systems such as time of flight measurement, phase-shift measurement, and interferometry, etc. can be utilized to measure the distance between the radiometer and the object.

Figure 8:
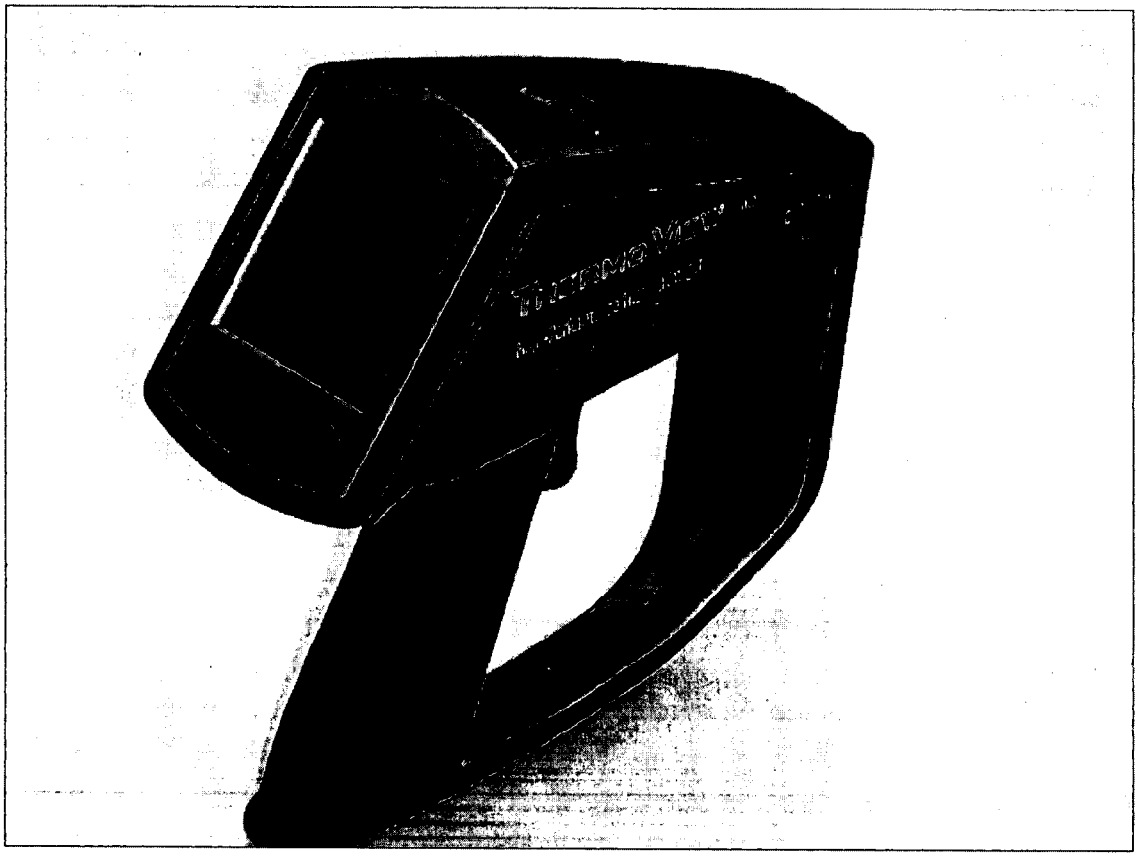
FIG. 8 is perspective view of a product configuration for use with an embodiment of the invention.

FIG. 8 depicts a possible product configuration for use with an embodiment of the invention which includes a housing having an integral grip and a digital display device formed therein. The IR optical system, digital imaging system, and rangefinder are internal and not visible in the diagram.

The various functional blocks depicted in the figures may be implemented as software including program code, stored on a computer readable medium, that is executed by a digital computer or by combinations of hardware and software. The computer readable medium may include, among other things, magnetic media, optical media, electromagnetic fields encoding digital information, and so on.

Alternatives and substitutions will now be apparent to persons of ordinary skill in art. For example, the above-described embodiment employs an optical system that images a circular energy zone. However, the invention also applies to radiometers having optical systems that image other shapes such a ellipses, rectangles, etc. Further, the invention is equally applicable to systems having close focusing or distant focusing IR optics. Also, other techniques are known for overlaying a geometric figure on an image and can be employed to implement different embodiments of the invention. Accordingly, it is not intended to limit the invention except as provided by the appended claims.

What is claimed is:

1. A system for indicating the location of an energy zone on an object surface, with the energy zone being an area on the object surface that is imaged onto an IR detector by the IR optical system included in a non-contact IR thermal measurement device, said system comprising:
    a video sub-system for displaying a displayed image of at least a part of the object surface not included in the energy zone and of at least a part of the object surface included in the energy zone;
    a range-finding sub-system for measuring the distance between the non-contact IR thermal measurement device and the object surface and outputting a distance signal indicating a measured distance; and
    an optical overlay sub-system, coupled to the range-finding sub-system, for overlaying a shape outline, having a dimension determined by a received measured distance, over the displayed image of the object surface and with the shape outline indicating the extent of a displayed image included in the energy zone.

2. The system of claim 1 where the range-finding subsystem comprises:

a laser diode for emitting a laser-beam along a first optical axis;

a position-sensitive photodiode, having a major surface and displaced from the first optical axis, for receiving a portion of the laser beam reflected from the object surface and indicating the position of a reflected portion on the major surface.

3. The system of claim 2 where the first axis is substantially coincident with the optical axis of the IR optical system so that the laser beam indicates the center of the energy zone.

4. The system of claim 1 where the video-subsystem comprises:

a digital image generating chip for outputting digital image data, a display device for displaying digital image data, and an image controller chip for controlling the display device to display digital image data provided by the image generating chip;

and where the optical overlay subsystem includes:

a storage device for storing circle data utilized to form circle images of different diameters;

and with the image controller coupled to the storage device and the range-finding sub-system, programmed to select circle data from the storage device for generating a circle having a diameter size determined by the measured distance provided by the range-finding subsystem.

5. The system of claim 1 where the shape outline is a circle.

6. A method for indicating the location of an energy zone on an object surface, with the energy zone being an area on the object surface that is imaged onto an IR detector by the IR optical system included in a non-contact IR thermal measurement device, said method comprising steps of:

acquiring a digital image of the object surface;

displaying a digital image of the object, with the digital image including a part of the object surface not included in the energy zone;

measuring the distance to the object surface to obtain a distance value;

forming a geometrical shape indicating the portion of the object surface indicating the portion of the object surface included in the energy zone with a dimension of the geometrical shape determined by the distance value; and overlaying the geometrical shape over the digital image of the object surface to indicate the location of the energy zone.

7. The method of claim 6 where the step of forming a geometrical image further comprises the step of:

compensating for parallax between the acquired digital image and an optical axis of the IR optical system.

8. A system for indicating the location of an energy zone on an object surface, with the energy zone being an area on the object surface that is imaged onto an IR detector by the IR optical system included in a non-contact IR thermal measurement device, said system comprising:

means for acquiring a digital image of the object surface;

means for displaying a digital image of the object surface, with the digital image including a part of the object surface not included in the energy zone;

means for measuring the distance to the object surface to obtain a distance value;

means for forming a geometrical shape indicating the portion of the object surface indicating the portion of the object surface included in the energy zone, with the geometrical shape having a dimension determined by the distance value; and means for overlaying the geometrical shape over the digital image of the object surface to indicate the location of the energy zone.

9. The system of claim 8 where the means for forming a geometrical image further comprises:

means for compensating for parallax between the acquired digital image and an optical axis of the IR optical system.

* * * * *